United States Patent [19]

Wölber

[11] Patent Number: 4,812,906
[45] Date of Patent: Mar. 14, 1989

[54] CIRCUIT ARRANGEMENT FOR FREQUENCY DIVISION

[75] Inventor: Jörg Wölber, Pinneberg, Fed. Rep. of Germany

[73] Assignee: U.S. Philips Corporation, New York, N.Y.

[21] Appl. No.: 4,922

[22] Filed: Jan. 20, 1987

[30] Foreign Application Priority Data

Jan. 23, 1986 [DE] Fed. Rep. of Germany ....... 3601858

[51] Int. Cl.$^4$ ......................... H04N 5/04; H04N 5/05; H04N 9/79
[52] U.S. Cl. ..................................... 358/149; 358/148; 358/153; 358/320; 358/337; 328/63; 328/139; 328/179
[58] Field of Search ............... 358/148, 149, 153, 154, 358/155, 156, 158, 319, 320, 337, 11, 12, 17, 140, 141; 328/63, 129.1, 133, 139, 179; 360/33.1, 36.1, 37.1

[56] References Cited

U.S. PATENT DOCUMENTS 4,245,235  1/1981  Poetsch .
4,607,292  8/1986  Kojima et al. ................... 358/11
4,688,094  8/1987  Tanabe et al. ................... 358/148

Primary Examiner—James J. Groody
Assistant Examiner—Michael D. Parker
Attorney, Agent, or Firm—Michael E. Marion

[57] ABSTRACT

The invention relates to a circuit arrangement for a video recorder which derives a line frequency signal from a pulse-shaped oscillator signal by means of a plurality of frequency dividers. The arrangement comprises a first section suitable for VHS or Video-8 video recorders in conformity with the PAL or NTSC standard and a second section adapted to the relevant standard.

9 Claims, 3 Drawing Sheets

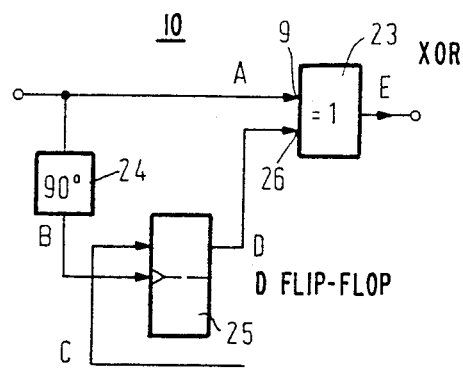
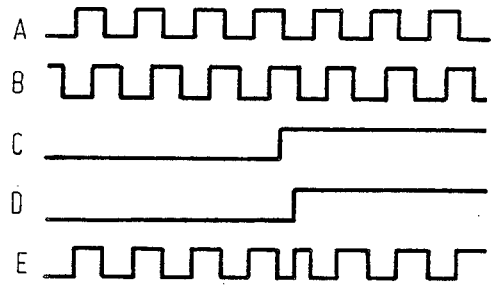
Fig. 3                    Fig. 3a
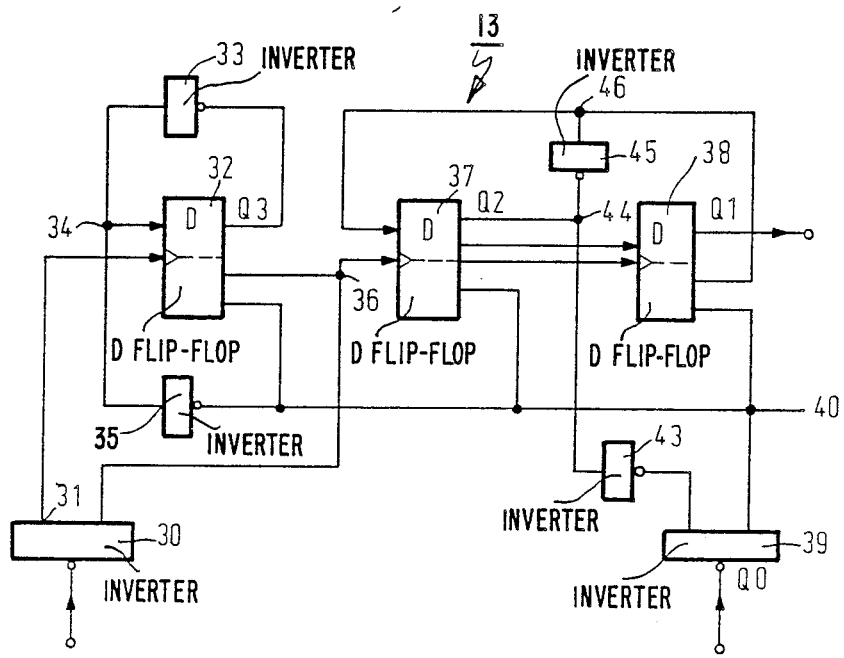
Fig. 4

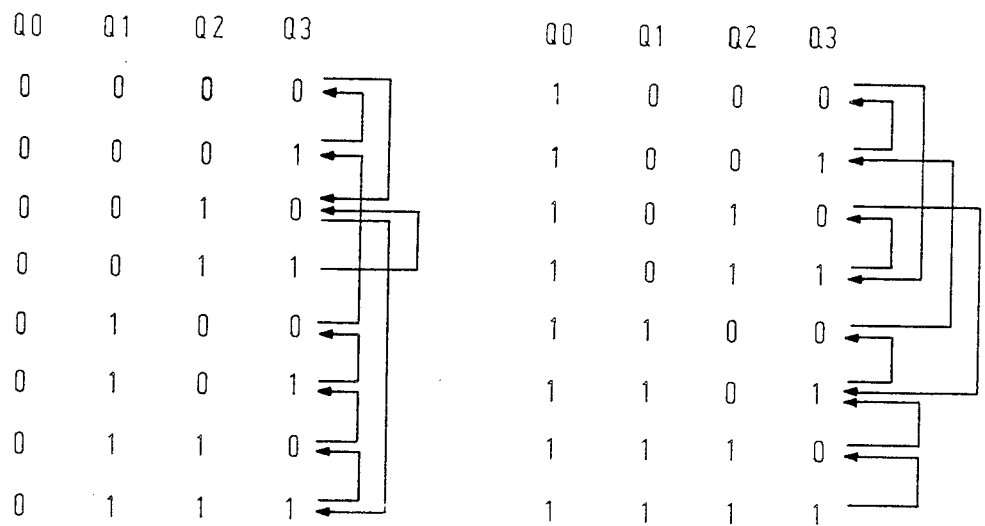
Fig. 5a
Fig. 5b
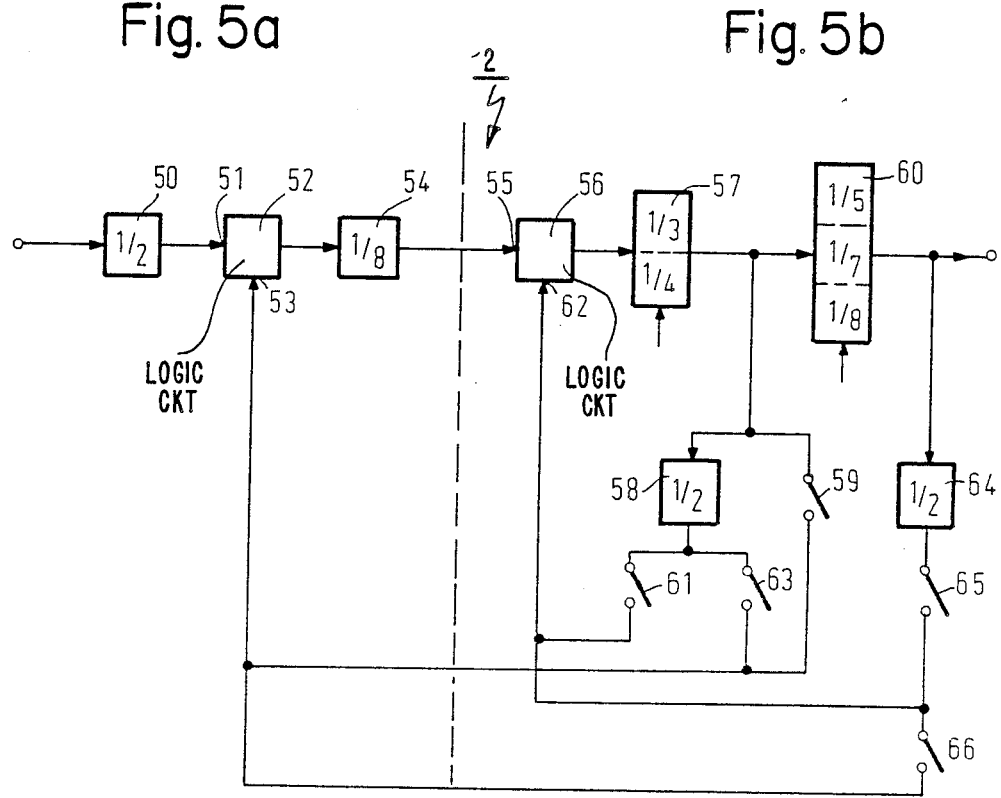
Fig. 6

CIRCUIT ARRANGEMENT FOR FREQUENCY DIVISION

BACKGROUND OF THE INVENTION

The invention relates to a circuit arrangement for a video recorder, for deriving a line-frequency signal from an input signal by means of a plurality of frequency dividers, comprising:
an input terminal for receiving the input signal, and
an output terminal for supplying the line-frequency signal.

In order to reduce production costs it is desirable to equip video recorders with a single circuit board for use with different standards, for example for Video 8 or VHS in accordance with the PAL or the NTSC standard. Such a circuit board should then be provided with integrated circuits which are suitable for each of these standards and which only have to be set to the relevant standard.

A circuit arrangement of the type defined in the opening paragraph is employed in the integrated circuit TDA 3755, which serves as PAL/NTSC synchronization processor for VHS video recorders. This circuit arrangement serves to divide a signal generated by a controlled oscillator by 320 for the NTSC standard or by 321 for the PAL standard. A phase comparator generates an oscillator control signal which depends on the phase difference between a received line-frequency signal and the output signal of the circuit arrangement.

In the circuit arrangement the input signal is applied to a first input of a rejection circuit via a frefrequency divider having a dividing ratio of 2. The output of the rejection circuit is connected to a frequency divider which has a dividing ratio of 160 and which supplies the line-frequency signal. The line-frequency signal is applied to a second input of the rejection circuit via a disconnectible feedback branch comprising a further frequency divider with a dividing ratio of 2. An edge, i.e. a transition from a lower to a higher potential or, conversely, from a higher to the lower potential, in the output signal of the rejection circuit coincides with an edge in the signal on the first input if there is no edge in the signal on the second input. When an edge appears in the signal on the second input the rejection circuit ensures that the next edge of the signal on the first input produces an edge in the output signal. The feedback branch is disconnected when signals in conformity with the NTSC standard are processed.

SUMMARY OF THE INVENTION

It is the object of the invention to construct a circuit arrangement of the type defined in the opening paragraph in such a way that it comprises a first section which can be used with different video-recorder standards and a second section which is adapted to the instantaneous standard.

A first solution to this problem is characterized in that a first section of the circuit arrangement comprises a first logic circuit having two inputs and one output, and a first frequency divider having a dividing ratio of 9, in that the input terminal is coupled to a first input of the logic circuit whose output is coupled to an input of the first frequency divider, in that the logic circuit is constructed to insert an edge into the signal present on the first input if an edge occurs in a signal on the second input of the logic circuit, in that a second section of the circuit arrangement, which section is coupled to an output of the first frequency divider, comprises a second frequency divider, and a third frequency divider having a dividing ratio of 3 and having its output coupled to the output terminal, in that a fourth frequency divider having a dividing ratio of 2 is arranged in the signal path between the input terminal and the output terminal, and in that the following steps are applied separately or in combination, (a) for the VHS-NTSC standard the output of the first frequency divider is coupled to a first input of an AND-gate via the second frequency divider having a dividing ratio of 6 and to a second input of the AND gate via the third frequency divider, the output of said AND gate being coupled to the second input of the first logic circuit, (b) for the VHS-PAL standard the output of the first frequency divider is coupled, via the second frequency divider having a dividing ratio of 6, to the third frequency divider and the output of the second frequency divider is coupled via a fifth frequency divider having a dividing ratio of 2 to the second input of the first logic circuit.

(c) for the Video-8 NTSC standard the output of the first frequency divider is coupled to the third frequency divider via the second frequency divider having a dividing ratio of 7, (d) for the Video-8 PAL standard the output of the first frequency divider is coupled via the second frequency divider having a dividing ratio of 7 to the third frequency divider and the output of the second frequency divider is coupled via a fifth frequency divider having a dividing ratio of 2 to the second input of the first logic circuit.

A second solution to this problem is characterized in that a first section of the circuit arrangement comprises a first logic circuit having two inputs and an output, and a first frequency divider having a dividing ratio of 8, in that the input terminal is coupled to a first input of the first logic circuit, whose output is coupled to an input of the first frequency divider, in that a second section of the circuit arrangement, which section is coupled to an output of the first frequency divider, is coupled to a second logic circuit, having two inputs and one output, a second frequency divider, and a third frequency divider whose output is coupled to the output terminal, in that the two logic circuits are constructed to insert an edge into the signal on the first input if a signal on the second input of the relevant logic circuit contains an edge, in that a fourth frequency divider having a dividing ratio of 2 is arranged in the signal path between the input terminal and the output terminal, and in that the following steps are applied separately or in combination, (a) for the VHS NTSC standard the output of the second logic circuit is coupled to the third frequency divider having a dividing ratio of 5 via the second frequency divider having a dividing ratio of 4, (b) for the VHS PAL standard the output of the second logic circuit is coupled, by means of the second frequency divider having a dividing ratio of 3, to the second input of the first logic circuit via a fifth frequency divider having a dividing ratio of 2 and to the second input of the second logic circuit via the third frequency divider having a dividing ratio of 7 and a sixth frequency divider having a dividing ratio of 2, (c) for the Video-8-NTSC standard the output of the second logic element is coupled to the input of the second frequency divider having a dividing ratio of 4 and having its output coupled to the second input of the first logic circuit, to the second input of the second logic circuit via a fifth frequency divider having a dividing ratio of 2, and to an input of the third frequency divider having a dividing ratio of 7, (d) for the Video-8 PAL standard the output of the second logic circuit is coupled to the third frequency divider having a dividing ratio of 8 via the second frequency divider having a dividing ratio of 3, the output of said third frequency divider being coupled to the second input of the first and the second logic circuit via a sixth frequency divider having a dividing ratio of 2.

The circuit arrangement in accordance with the invention may be constructed in such a way that the steps a to d can be used separately or in the following preferred combinations: a and b, c and d, a and c, b and d, or a and b and c and d. If the various steps are combined in accordance with one of the said possibilities, switches must be arranged in the second section of the arrangement to establish the connections between the individual circuit elements required for a specific standard. In part, the second frequency dividers employed for both solutions and the third frequency divider employed for the second solution have different dividing ratios of the different standards. In combining the steps the second and the third frequency divider may be constructed to comprise circuit elements which are interconnected by means of switches in such a way that dividing ratios in conformity with the desired standard are obtained.

The circuit arrangement divides the frequency of the relevant input signal by the following factors for the various standards:

VHS - NTSC: 320
VHS - PAL: 321
Video 8-NTSC: 378
Video 8-PAL: 375.

The first input of a logic circuit receives a signal whose frequency is substantially lower than the frequency of the signal on its second input. The output signal of the logic circuit generally contains an edge when the signal on the first input contains an edge. Such an edge is characterized by a transition from a lower to a higher potential or, conversely, from a higher to a lower potential. However, if such an edge appears in the signal on the second input, this produces a transition in the output signal. The logic circuit consequently forms the sum of the number of edges in the signal on the first input and that on the second input. Thus, by means of a logic circuit the number of periods of the signal on the output of the logic circuit is increased by one period in comparison with the number of periods in the signal on the first input, referred to one period of the signal on the second input.

In order to obtain a signal of line frequency and twice the line frequency in accordance with the first solution, the fourth frequency divider is arranged in the second section between the output of the third frequency divider and the output terminal. In accordance with the second solution the fourth frequency divider is arranged in the first section before the first input of the first logic circuit.

Since frequencies in the MHz range are divided to obtain frequencies in the kHz range, it is preferred to apply a combination of ECL technology and I²L technology. As is known, the ECL technology can operate with high frequencies but requires more power and more chip area than the I²L technology which can only be used at frequencies starting from a few kHz. Therefore, the first section of the arrangement is constructed in ECL technology and the second section in I²L technology.

In one embodiment the first input of an EXCLUSIVE-OR gate constitutes the first input of the logic circuit and the second input of the EXCLUSIVE-OR gate is connected to the output of a multivibrator circuit whose enable input constitutes the second input of the logic circuit and a 90°-phase shift is introduced in the connection between the first input and a clock input of the multivibrator circuit. In this logic circuit no spurious pulses can appear, because an edge in the signal on the first input cannot appear simultaneously with an active edge on the clock input of the EXCLUSIVE-OR gate.

In a further embodiment of the invention the second frequency divider does not comprise more than three multivibrator circuits whose connections can be controlled so as to provide the appropriate dividing ratios. In accordance with the first solution the second frequency divider is operated in such a way that it provides a dividing ratio of 7 for the Video-8 standard and a dividing ratio of 6 for the VHS standard. In accordance with the second solution the second frequency divider can be constructed by means of two multivibrator circuits whose connections can be controlled so as to provide a dividing ratio of 3 for the PAL standard and a dividing ratio of 4 for the NTSC standard. Similarly, this solution enables the third frequency divider to be constructed by means of three multivibrator circuits, which are interconnected in such a way that dividing ratios of 5, 7 and 8 can be obtained.

BRIEF DESCRIPTION OF THE DRAWINGS

Embodiments of the invention will now be described in more detail, by way of example, with reference to the accompanying drawings. In the drawings:

FIG. 3 shows an example of the logic circuit employed in FIG. 2, FIG. 3A shows waveforms at various locations in the logic circuit of FIG. 3, FIG. 4 shows an example of a variable frequency divider used in FIG. 2, FIGS. 5a and 5b are state diagram to explain the operation of the frequency divider shown in FIG. 4, and FIG. 6 shows a second embodiment of the invention.

DETAILED DESCRIPTION OF THE INVENTION

Figure 1:
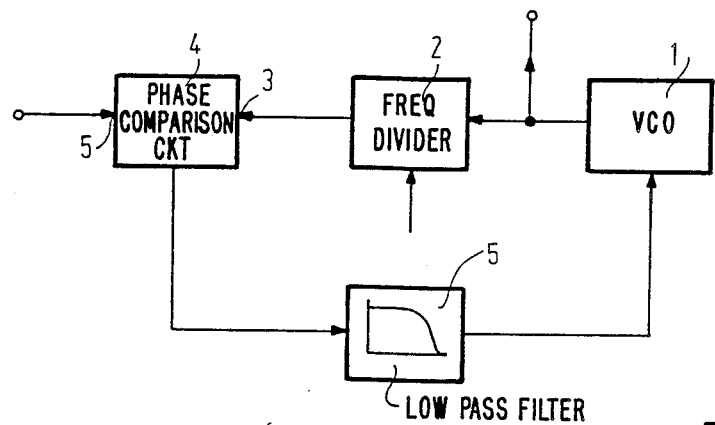
FIG. 1 shows a phase-locked loop in a video recorder comprising the circuit arrangement in accordance with the invention.

FIG. 1 shows a phase-locked loop used in a video recorder for adapting the frequency of an oscillator signal, which is generated by a voltage-controlled oscillator 1, to the line frequency. The oscillator 1 is controlled in such a way that the frequency of the oscillator signal is an integral multiple of the line frequency. Hereinafter, the frequency of a signal is to be understood to mean the number of periods per unit of time.

The oscillator signal generated by the voltage-controlled oscillator 1 is applied to a first input 3 of a phase comparison circuit 4 via a circuit arrangement 2 for frequency division or a frequency divider in accordance with the invention. The line-frequency signal is applied to another input 5 of the phase comparison circuit 4. For controlling the phase of the oscillator signal generated by the oscillator an output signal corresponding to the phase difference between said two signals is applied to this oscillator via a low-pass filter 5, which rejects the signal components of a higher frequency.

The oscillator 1 generates four oscillator signals whose frequencies depend on the relevant standards. These frequencies are as follows:
VHS-NTSC standard: 320×15.75 kHz=5.04 MHz
VHS-PAL standard: 321×15.625 kHz=5.016 MHz
Video-8 NTSC-standard: 378×15.75 kHz=5.95 MHz
Video-8 PAL-standard: 375×15.625 kHz=5.86 MHz Consequently, the circuit arrangement 2 should be constructed in such a way that it exhibits a frequency dividing ratio in conformity with the relevant standard.

Figure 2:
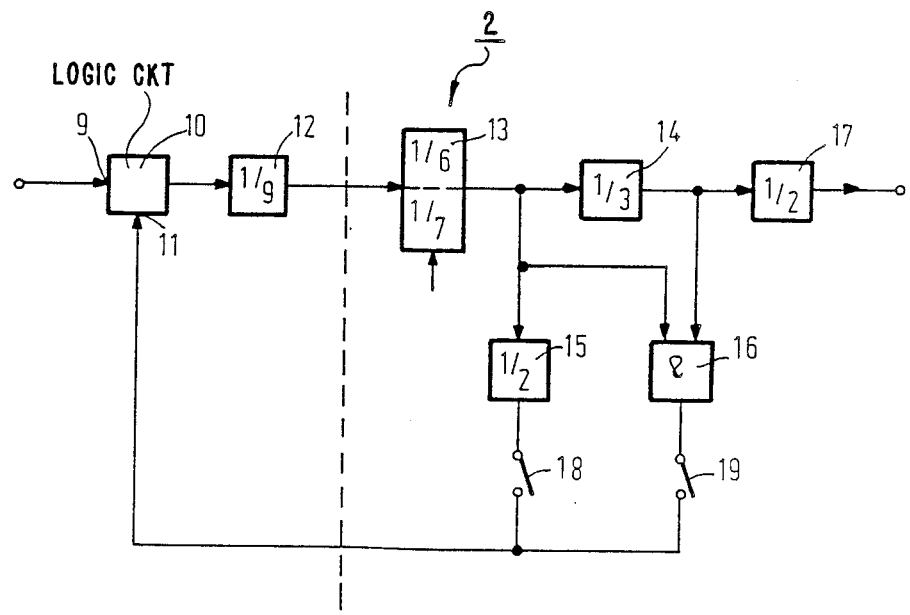
FIG. 2 shows a first embodiment of the invention.

FIG. 2 shows a circuit arrangement 2 in accordance with a first embodiment of the invention. The oscillator signal is applied to a first input 9 of a logic circuit 10. A further signal is applied to an input 11 of the logic circuit 10. When an edge appears in the signal on the input 11, i.e. when a transition from a higher to a lower potential or from a lower to a higher potential occurs, an edge is inserted into the oscillator signal, i.e. the output signal of the logic circuit 10 is provided with an additional edge in comparison with the oscillator signal on the first input 9.

The output signal of the logic circuit 10 is applied to a switchable frequency divider 13 having a dividing ratio of 6 or 7 via a frequency divider 12 having a dividing ratio of 9. The output of the frequency divider 13 is connected to the input of the frequency divider 14 having a dividing ratio of 3, to a frequency divider 15 having a dividing ratio of 2, and to the first input of an AND gate 16. The output signal of the frequency divider 14 is applied to a frequency divider 17 having a dividing ratio of 2, on whose output the line-frequency output signal of the circuit arrangement 2 in accordance with the invention is available, and to the second input of the AND gate 16. The output of the frequency divider 15 is connected to a switch 18 and the output of the AND gate 16 is connected to a switch 19. The other terminal of the switch 18 and the other terminal of the switch 19 are connected to the input 11 of the logic circuit 10.

FIG. 3 shows an example of the logic circuit 10, whose operation will be explained hereinafter. A signal A is applied to the first input of an EXCLUSIVE-OR gate 23, which input also constitutes the first input 9 of the logic circuit 10. The signal A and the other signal used in the arrangement shown in FIG. 3 are shown in the adjacent waveform diagram FIG. 3A. Further, the signal A is applied to a phase shifter 24 which provides a 90° phase shift of the signal A and which generates a signal B which is applied to a clock input of a D flip-flop 25. The enable input, i.e. the D input of the D flip-flop 25 receives a signal C, which as shown in the adjacent waveform diagram exhibits a transition from a lower to a higher potential, i.e. an edge appears in the signal C. The output signal D of the D flip-flop does not exhibit this transition until a trailing edge appears in the signal B. In the EXCLUSIVE-OR gate the signal E is derived from the signals A and D, which signal E exhibits a additional transition relative to the signal A, namely when a transition has appeared in the signal D.

The different dividing ratios in the arrangement in accordance with the invention shown in FIG. 2 are obtained by appropriately controlling the frequency divider 13 and the switches 18 and 19. The frequency divider 13 and the two switches 18 and 19 are controlled by a logic circuit, not shown, which determines the dividing ratio of the frequency divider 13, as will be described hereinafter, and which opens or closes the switches 18 and 19. The logic circuit responds to, for example, binary signals which indicate the instant-instantaneous standard. In order to obtain a dividing ratio of 320 in conformity with the VHS-NTSC standard a dividing ratio of 6 must be selected for the frequency divider 13, the switch 18 must be open and the switch 19 must be closed. The frequency divider has a dividing ratio of 321 in conformity with the VHS-PAL standard when the switch 18 is closed, the switch 19 is open and the frequency divider 13 is set to provide a dividing ratio of 6. In the case of the Video-8 NTSC and PAL standards the frequency divider 13 operates in such a way that it divides the signals applied to it by 7. The dividing ratio of 378 in accordance with the Video-8 NTSC standard is obtained when the switches 18 and 19 are open. The dividing ratio 375 in conformity with the Video-8 PAL standard is obtained when the switch 18 is closed and the switch 19 is open.

When the circuit arrangement is constructed in integrated-circuit technology in economical solution can be obtained in that a first section of the arrangement comprising the logic circuit 10 and the frequency divider 12 are realised in ECL-technology and a second section comprising the frequency dividers 13, 14, 17 and 15, the logic circuit 16 and the switches 18 and 19 are constructed in I²L technology. The basic principles of ECL and I²L technologies are described in, for example, the book by Jovan Antula, "Schaltungen der Mikroelektronik", Oldenbourg Verlag, 1984. In FIG. 2 the broken line represents the interface between the two technologies. Such interfaces are known from integrated circuits employing a hybrid technology i.e. ECL and I²L technology. However, it is also possible to use a MOS technology, the first section being constructed in a MOS technology which has a high current consumption and which enables high-frequency signals to be processed, and the second section being constructed in a MOS technology which has a low power consumption and which enable signals of lower frequencies to be processed.

FIG. 4 shows an example of the frequency divider 13 of FIG. 2 in I²L technology. The signal whose frequency is to be divided is applied to an inverter 30 whose first output 31 is connected to the clock input of D flip-flop 32. The output of the D flip-flop 32 is connected to an inverter 33. The output signal of the inverter 33 and the output signal of an inverter 35 are combined on a junction point 34 and are applied to the D input of the D flip-flop 32. In I²L technology such a junction point represents an AND operation. An inverted output of the D flip-flop 32 is connected to a junction point 36 which is also connected to the second output of the inverter 30. The signal from the junction point 36 is applied to the clock input of a D flip-flop 37 and to the clock input of a D flip-flop 38. An output of the D flip-flop 37 is connected to the D input of the D flip-flop 38. An output of the D flip-flop 38 also constitutes the output of the frequency divider 13.

The input of an inverter 39 constitutes the control input of the frequency divider 13. This means that depending on the state of the control signal the frequency divider either has a dividing ratio of 6 or 7. An output of the frequency divider 39 is connected to a junction point 40. The junction point 40 is also connected to inverted outputs of the D flip-flops 32, 37 and 38. The junction point 40 is connected to the input of the inverter 35. The second output of the inverter 39 is connected to a junction point 44 by an inverter 43. The junction point 44 is also connected to a further output of the D flip-flop 37. The output signal on the junction point 44 is applied to a junction point 46 via an inverter 45, which junction point 46 also receives a signal from an inverted output of the D flip-flop 38. The output signal on the junction point 46 is applied to the D input of the D flip-flop 37.

The operation of the frequency divider shown in FIG. 4 will be explained hereinafter with reference to the state diagram in FIG. 5. Signals of a high potential are referred to as "1" and signals of a low potential are referred to as "0". The input signal on the inverter 39 is referred to as Q0, the output signal of the D flip-flop 38 as Q1, the output signal of the D flip-flop 37 as Q2, and the output signal of the D flip-flop 32 as Q3.

Further, it is to be noted that an indication of the kind "010" represents the states of the signals Q1, Q2 and Q3, i.e. the left-hand digit represents the state of Q1, the central digit that of Q2, and the right-hand digit that of Q3. A change of state from for example "110" to "101" can occur only if an active edge has appeared in the input signal of the inverter 30, which happens once every period. It follows that in the output signal Q1 not more than two transitions should occur during six or seven periods of the input signal of the inverter 30 or, in other words, one period of the output signal Q1 corresponds to six or seven periods of the input signal of the inverter 30. If the control signal Q0 applied to the inverter 39 is "0" the frequency divider has a dividing ratio of 7 and if the control signal is "1" the frequency divider has a dividing ratio of 6.

Hereinafter the operation of the circuit shown in FIG. 4 is explained for a change from a state "101" to a state "100". The control signal Q0 is "0", so that a divider having a dividing ratio of 7 is obtained. First of all the states of the various signals are described before an active edge appears in the input signal of the inverter 30. The output signal of the inverter 39 is "1". As the output signal Q1 of the D flip-flop 38 is "1", the inverted output signal of this flip-flop will be "0". The output signal from the junction point 40 is "0", because such a junction point represents an AND operation in I²L technology, so that the output signal of the inverter 35 is a "1". Finally, a "0" state appears on the D input of the flip-flop 32, because the output signal of the inverter 33 is "0". The output signal from the junction 46 is then "0" because the inverted output of the D flip-flop 38 produces a "0" and the inverter 45 is constantly inhibited when the control signal Q0 is in the "0" state. After the appearance of an active edge in the input signal of the inverter 30 the output signal Q3 becomes "0". As in the case of an active edge a "0" appears on the inverted output of the D flip-flop 32, the clock input of the D flip-flop 37 does not receive an active edge, so that the output signal Q2 remains in the previous state. Similarly, the output signal Q1 remains in its previous state. Now the state "100" occurs until the next active edge.

If the control signal Q0 is "0", i.e. a dividing ratio of 7 is obtained, the following cycle is obtained, as is shown in FIG. 5a: "001", "000", "010", "111", "110", "101", "100", after which the cycle is repeated starting from "001". The state "011", which is missing in this cycle, can occur for example during switching on. However, this does not affect the frequency divider function because the next state is "010".

If the control signal is "1" the circuit arrangement of FIG. 4 provides a dividing ratio of 6. As is shown in FIG. 5b, this results in the following cycle: "001", "000", "011", "010", "101", "100", after which the state "001" recurs. The states "111" and "110" which are missing in this cycle can occur during switching on. However, after one or two states the state "101" is then obtained, so that the cycle for a dividing ratio of 6 is obtained again. In FIG. 5 the two cycles for a dividing ratio of 6 and 7 are indicated by means of arrows.

FIG. 6 shows a circuit arrangement 2 in accordance with a second embodiment of the invention. The oscillator signal is applied to a frequency divider 50 having a dividing ratio of 2. The output of the frequency divider 50 is connected to a first input 51 of logic circuit 52, which has a second input 53. The output signal of the logic circuit 52 is applied to an input 55 of a further logic circuit 56 via a frequency divider 54 having a dividing ratio of 8. The output of the logic circuit 57 is connected to a switchable frequency divider 57, which can be set to a dividing ratio of 3 or 4.

The output signal of the frequency divider 57 is applied to a further frequency divider 60, to a frequency divider 58 having a dividing ratio of 2, and to the second input 53 of the logic circuit 52 via a switch 59. The frequency divider 60 can be set to operate with a dividing ratio of 5, 7 or 8. The output signal of the frequency divider 58 is applied to the second input 62 of the logic circuit 56 via a switch 61 and to the second input 53 of the logic circuit 52 via a switch 63. The output signal of the frequency divider 60, which is the output signal of the circuit arrangement 2 in accordance with the invention, is applied to a frequency divider which has a dividing ratio of 2 and whose output signal is applied to the second input 62 of the logic circuit 56 via a switch 65 and to the second input 53 of the logic circuit 52 via a switch 66. The logic circuits 52 and 56 may be constructed in the same way a the logic circuit shown in FIG. 3. When an edge appears in the signal on the second input the logic circuits should insert in the output signal an additional edge as compared with the signal on the first input.

The different dividing ratios of the circuit arrangement in accordance with the invention shown in FIG. 6 are obtained by controlling the frequency dividers 57 and 60 and the switches 59, 61, 63, 65 and 66. A dividing ratio of 320 in conformity with the VHS-NTSC standard is obtained in that a dividing ratio of 4 is selected for the frequency divider 57 and the dividing ratio of 5 for the frequency divider 60, all the switches being open. The frequency divider has a dividing ratio of 321 in conformity with the VHS-PAL standard when the switches 63 and 65 are closed and all the other switches are open, the frequency divider 57 is set to a dividing ratio of 3, and the frequency divider 60 to a dividing ratio of 7. The dividing ratio of 378 in conformity with the Video-8 NTSC standard is obtained when the switches 59 and 61 are closed and the other switches are open and the frequency divider 57 has a dividing ratio of 4 and the frequency divider 60 a dividing ratio of 7. In order to obtain a dividing ratio of 375 in conformity with the Video-8 PAL standard the switches 65 and 66 must be closed and the other switches must be open, the frequency divider 57 being set to a dividing ratio of 3 and the frequency divider 60 to a dividing ratio of 8.

In the circuit arrangement shown in FIG. 6 it is also effective to construct the frequency dividers 50 and 54 and the logic circuit 52 in ECL technology and the remaining circuit elements in I²L technology.

The interface between the two technologies is also indicated by the broken line in FIG. 6.

FIGS. 2 and 6 show two embodiments of the invention which enable the dividing ratios for the VHS and the Video-8 standard respectively for PAL or NTSC to be obtained. However, the circuit arrangements in accordance with the relevant standards may also be realized separately or in combination. For example, circuits may be constructed which are suitable for VHS video recorders which can operate in accordance with the PAL or the NTSC standard or which are suitable for Video-8 video recorders which can operate in accordance with the PAL or the NTSC standard.

What is claimed is:

1. A circuit arrangement for a video recorder, for deriving a line-frequency signal from an input signal by means of a plurality of frequency dividers, comprising:
    an input terminal for receiving the input signal, and
    an output terminal for supplying the line-frequency signal, characterized in that a first section of the circuit arrangement comprises a first logic circuit having two inputs and one output, and a first frequency divider having a dividing ratio of 9, in that the input terminal is coupled to a first input of the logic circuit whose output is coupled to an input of the first frequency divider, in that the logic circuit is constructed to insert an edge into the signal present on the first input if an edge occurs in a signal on the second input of the logic circuit, in that a second section of the circuit arrangement, which section is coupled to an output of the first frequency divider, comprises a second frequency divider, and a third frequency divider having a dividing ratio of 3 and having its output coupled to the output terminal, in that a fourth frequency divider having a divider ratio of 2 is arranged in the signal path between the input terminal and the output terminal, and in that the following steps are applied separately or in combination,
    (a) for the VHS-NTSC standard the output of the first frequency divider is coupled to a first input of an AND gate via the second frequency divider having a dividing ratio of 6 and to a second input of the AND gate via the third frequency divider, the output of said AND gate being coupled to the second input of the first logic circuit,
    (b) for the VHS-PAL standard the output of the first frequency divider is coupled via the second frequency divider to the third frequency divider and the output of the second frequency divider is coupled via a fifth frequency divider having a dividing ratio of 2 to the second input of the first logic circuit,
    (c) for the Video-8 NTSC standard the output of the first frequency divider is coupled to the third frequency divider via the second frequency divider having a dividing ratio of 7,
    (d) for the Video-8 PAL standard the output of the first frequency divider is coupled, via the second frequency divider having a dividing ratio of 7 to the third frequency divider and the output of the second frequency divider is coupled via said fifth frequency divider having a dividing ratio of 2 to the second input of the first logic circuit.

2. A circuit arrangement for a video recorder, for deriving a line-frequency signal from an input signal by means of a plurality of frequency dividers comprising
    an input terminal for receiving the input signal, and
    an output terminal for supplying the line-frequency signal, characterized in that a first section of the circuit arrangement comprises a first logic circuit having two inputs and an output, and a first frequency divider having a dividing ratio of 8, in that the input terminal is coupled to a first input of the first logic circuit, whose output is coupled to an input of the first frequency divider, in that a second section of the circuit arrangement, which section is coupled to an output of the first frequency divider, is coupled to a second logic circuit having two inputs and one output, a second frequency divider, and a third frequency divider whose output is coupled to the output terminal, in that the two logic circuits are constructed to insert an edge into the signal on the first input if a signal on the second input of the relevant logic circuit contains an edge, in that a fourth frequency divider having a dividing ratio of 2 is arranged in the signal path between the input terminal and the output terminal, and in that the following steps are applied separately or in combination,
    (a) for the VHS NTSC standard the output of the second logic circuit is coupled to the third frequency divider having a dividing ratio of 5 via the second frequency divider having a dividing ratio of 4,
    (b) for the VHS PAL standard the output of the second logic circuit is coupled, by means of the second frequency divider having a dividing ratio of 3, to the second input of the first logic circuit via a fifth frequency divider having a dividing ratio of 2 and to the second input of the second logic circuit via the third frequency divider having a dividing ratio of 7 and a sixth frequency divider having a dividing ratio of 2,
    (c) for the Video-8 NTSC standard the output of the second logic element is coupled to the input of the second frequency divider having a dividing ratio of 4 and having its output coupled to the second input of the first logic circuit, to the second input of the second logic circuit via a fifth frequency divider having a dividing ratio of 2, and to an input of the third frequency divider having a dividing ratio of 7,
    (d) for the Video-8 PAL standard the output of the second logic circuit is coupled to the third frequency divider having a dividing ratio of 8 via the second frequency divider having a dividing ratio of 3, the output of said third frequency divider being coupled to the second input of the first and the second logic circuit via a sixth frequency divider having a dividing ratio of 2.

3. A circuit arrangement as claimed in claim 1, characterized in that the fourth frequency divider is arranged in the second section between the output of the third frequency divider and the output terminal.

4. A circuit arrangement as claimed in claim 2, characterized in that the fourth frequency divider is arranged in the first section before the first input of the first logic circuit.

5. A circuit arrangement as claimed in any one of claims 2–4 or 8, characterized in that the first section is constructed in ECL technology and the second section is constructed in I²L technology.

6. A circuit arrangement as claimed in any one of claims 2–4 or 1, characterized in that the first input of an EXCLUSIVE-OR gate constitutes the first input of the logic circuit and the second input of the EXCLUSIVE-OR gate is connected to the output of a flip-flop whose enable input constitutes the second input of the logic circuit, and in that a 90° phase shift is introduced in the connection between the first input and a clock input of the flip-flop (FIG. 3).

7. A circuit arrangement as claimed in any one of claims 2–4 or 1, characterized in that the second frequency divider does not comprise more than three flip-flops whose connections can be controlled so as to provide the appropriate dividing ratio.

8. A circuit arrangement for a video recorder, for deriving a line-frequency signal from an input signal by means of a plurality of frequency dividers, comprising:
an input terminal for receiving the input signal, and
an output terminal for supplying the line-frequency signal, characterized in that a first section of the circuit arrangement comprises a first logic circuit having two inputs and one output, and a first frequency divider having a dividing ratio of 9 in that the input terminal is coupled to a first input of the logic circuit whose output is coupled to an input of the first frequency divider, in that the logic circuit is constructed to insert an edge into the signal present on the first input if an edge occurs in a signal on the second input of the logic circuit, in that a second section of the circuit arrangement, which section is coupled to an output of the first frequency divider, comprises a second frequency divider, and a third frequency divider having a dividing ratio of 3 and having its output coupled to the output terminal, in that a fourth frequency divider having a divider ratio of 2 is arranged in the signal path between the input terminal and the output terminal, and further comprising:
(a) for the VHS-NTSC standard, an AND gate having first and second inputs and an output, said output of said first frequency divider coupled to said first input of said AND gate via said second frequency divider and to said second input of said AND gate via said third frequency divider, said output of said AND gate coupled to said second input of said first logic circuit; and selecting means coupled to said second frequency divider for setting its dividing ratio, said selecting means providing a dividing ratio of 6;
(b) for the VHS-PAL standard, a fifth frequency divider having a dividing ratio of 2, the output of said first frequency divider coupled to said third frequency divider via said second frequency divider and the output of said second frequency divider coupled to said second input of said first logic circuit via said fifth frequency divider;
(c) for the Video-8 NTSC standard, said output of said first frequency divider coupled to said third frequency divider via said second frequency divider, said selecting means setting the dividing ratio of said second frequency divider to 7;
(d) for the Video-8 PAL standard, the output said first frequency divider coupled to said third frequency divider via said second frequency divider and the output of said second frequency divider coupled to said second input of said first logic circuit via said fifth frequency divider, said selecting means setting the dividing ratio of said second frequency divider to 7.

9. A circuit arrangement for a video recorder, for deriving a line-frequency signal from an input signal by means of a plurality of frequency dividers comprising
an input terminal for receiving the input signal, and
an output terminal for supplying the line-frequency signal, characterized in that a first section of the circuit arrangement comprises a first logic circuit having two inputs and an output, and a first frequency divider having a dividing ratio of 8, in that the input terminal is coupled to a first input of the first logic circuit, whose output is coupled to an input of the first frequency divider, in that a second section of the circuit arrangement, which section is coupled to an output of the first frequency divider, is coupled to a second logic circuit having two inputs and one output, a second frequency divider, and a third frequency divider whose output is coupled to the output terminal, in that the two logic circuits are constructed to insert an edge into the signal on the first input if a signal on the second input of the relevant logic circuit contains an edge, in that a fourth frequency divider having a dividing ratio of 2 is arranged in the signal path between the input terminal and the output terminal, further comprising:
(a) for the VHS NTSC standard, said output of said second logic circuit coupled to said third frequency divider via said second frequency divider, a first selecting means coupled to said third frequency divider setting its dividing ratio to 5 and a second selecting means coupled to said second frequency divider setting its dividing ratio to 4.
(b) for said VHS PAL standard, said output of said second frequency divider is coupled to said second input of said first logic circuit via a fifth frequency divider having a dividing ratio of 2 and to said second input of said second logic circuit via said third frequency divider and a sixth frequency divider having a dividing ratio of 2; said first selecting means setting the dividing ratio of said third frequency divider to 7, said second selecting means setting the dividing ratio of said second frequency divider to 3;
(c) for said Video-8 NTSC standard, sad output of said second logic element coupled to said input of said second frequency divider; said output of said second frequency divider coupled to said second input of said first logic circuit, to said second input of said second logic circuit via said fifth frequency divider and to said third frequency divider; said second selecting means setting the dividing ratio of said second frequency divider to 4 and said first selecting means setting the dividing ratio of said third frequency divider to 7;
(d) for the Video 8-PAL standard, said output of said second logic circuit coupled to said third frequency divider via said second frequency divider; said output of said third frequency divider coupled to said second inputs of said first and second logic circuits via said sixth frequency divider; said first selecting means setting the dividing ratio of said third frequency divider to 8, said second selecting means setting the dividing ratio of said second frequency divider to 3.

* * * * *